(12) United States Patent
Ariga (10) Patent No.: US 9,716,840 B2
(45) Date of Patent: Jul. 25, 2017

(54) IMAGE PICKUP APPARATUS THAT REDUCES UNEVENNESS OF EXPOSURE CAUSED BY ARTIFICIAL LIGHT SOURCE, METHOD OF DETECTING CHANGE IN AMOUNT OF LIGHT, AND STORAGE MEDIUM

(71) Applicant: CANON KABUSHIKI KAISHA, Tokyo (JP)

(72) Inventor: Yuichi Ariga, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/145,092

(22) Filed: May 3, 2016

(65) Prior Publication Data
US 2016/0330359 A1 Nov. 10, 2016

(30) Foreign Application Priority Data
May 8, 2015 (JP) ................................. 2015-095593

(51) Int. Cl.
*H04N 5/235* (2006.01)
*H04N 5/353* (2011.01)

(52) U.S. Cl.
CPC ......... *H04N 5/2357* (2013.01); *H04N 5/2353* (2013.01); *H04N 5/3532* (2013.01)

(58) Field of Classification Search
CPC .. H04N 5/2357; H04N 5/2351; H04N 5/2353; H04N 5/3532; H04N 5/378
USPC .................................................... 348/226.1
See application file for complete search history.

(56) References Cited

U.S. PATENT DOCUMENTS

| 2003/0030744 | A1* | 2/2003 | Baer | H04N 5/217 348/370 |
| 2006/0232686 | A1* | 10/2006 | Ono | H04N 5/235 348/226.1 |
| 2011/0205394 | A1* | 8/2011 | Fuchigami | H04N 5/243 348/226.1 |
| 2011/0255786 | A1* | 10/2011 | Hunter | H04N 5/21 382/190 |
| 2012/0320232 | A1* | 12/2012 | Trumbo | H04N 5/2357 348/226.1 |
| 2014/0211041 | A1* | 7/2014 | McCrackin | H04N 9/735 348/223.1 |

(Continued)

FOREIGN PATENT DOCUMENTS

JP 2004-260574 A 9/2004

*Primary Examiner* — Pritham Prabhakher
(74) *Attorney, Agent, or Firm* — Cowan, Liebowitz & Latman, P.C.

(57) ABSTRACT

An image pickup apparatus which is capable of, when performing continuous shooting at high shutter speed under an artificial light source with varying amounts of light, reducing the effects of a change in the amount of light on a picked-up image without decreasing frame speed. A frequency and a characteristic point of a change in the amount of light of flicker are detected based on an image signal read out from an image pickup device. Based on the frequency detected at first timing before continuous shooting is performed and the characteristic point detected at second timing later than the first timing during continuous shooting, a characteristic point of a change in the amount of light of flicker after the second timing is predicted. Timing of light exposure is controlled so as to be coincident with the characteristic point after the second timing.

11 Claims, 10 Drawing Sheets

(56) References Cited

U.S. PATENT DOCUMENTS

| | | | | |
|---|---|---|---|---|
| 2014/0333799 A1* | 11/2014 | Nakagawara | ........ | H04N 5/2357 348/228.1 |
| 2015/0116537 A1* | 4/2015 | Ariga | ................... | H04N 5/2353 348/226.1 |
| 2015/0138392 A1* | 5/2015 | Sugawara | ............ | H04N 5/2351 348/226.1 |
| 2015/0312459 A1* | 10/2015 | Nakagawara | ........ | H04N 5/2357 348/228.1 |

\* cited by examiner

IMAGE PICKUP APPARATUS THAT REDUCES UNEVENNESS OF EXPOSURE CAUSED BY ARTIFICIAL LIGHT SOURCE, METHOD OF DETECTING CHANGE IN AMOUNT OF LIGHT, AND STORAGE MEDIUM

BACKGROUND OF THE INVENTION

Field of the Invention

The present invention relates to an image pickup apparatus such as a digital camera, a method of detecting a change in the amount of light during image pickup, and a storage medium, and in particular to a technique for reducing unevenness of exposure arising from a change in the amount of light from an artificial light source during image pickup under the artificial light source.

Description of the Related Art

Conventionally, when images are picked up using an image pickup apparatus such as a digital camera under an artificial light source with varying amounts of light, the effects of flicker on picked-up images are reduced by synchronizing shutter speed during light exposure to a cycle of change in the amount of light so that amounts of light exposure in respective scanning lines of an image pickup device can be uniform. In the following description, as deemed appropriate, an artificial light source with varying amounts of light is referred to as a flickering light source, and a change in the amount of light is referred to as flicker.

A variety of methods for accurately detecting flicker when picking up an image have been proposed. For example, there has been proposed a method that calculates a value of line lightness by summing pixel levels in each scanning line within one frame, extracts a variation cycle of the calculated value of line lightness in a vertical scanning direction, and when the extracted variation cycle falls inside a predetermined frequency range, determines that there is flicker (see Japanese Laid-Open Patent Publication (Kokai) No. 2004-260574).

However, even when it is possible to accurately detect flicker, frame speed during continuous shooting cannot be increased if shutter speed in light exposure is synchronized to a cycle of change in the amount of light of flicker. Also, frame speed cannot be increased if the presence or absence of flicker is determined each time a still image of one frame is picked up during continuous shooting. On the other hand, as the resolution of image pickup devices is increasing lately, it is becoming increasingly common to pick up images with a high shutter speed of, for example, 1/4000 second even under a flickering light source, but the above publication of the prior art does not mention a technique for applying flicker detection results to continuous shooting at high shutter speed.

SUMMARY OF THE INVENTION

The present invention provides an image pickup apparatus which is capable of, when performing continuous shooting at high shutter speed under an artificial light source with varying amounts of light, reducing the effects of a change in the amount of light on a picked-up image without decreasing frame speed.

Accordingly, a first aspect of the present invention provides an image pickup apparatus comprising an image pickup device, a readout unit configured to readout an image signal of one frame from the image pickup device for detecting a frequency and a characteristic point of a change in an amount of light of flicker before continuous shooting is performed using the image pickup device, and readout an image signal of one frame from the image pickup device for detecting only a characteristic point of the change in the amount of light of flicker whenever image pickup for obtaining a still image of one frame is performed during continuous shooting, a detection unit configured to be capable of detecting a frequency and a characteristic point of the change in the amount of light of flicker based on the image signal readout by the reading unit, a predicting unit configured to, based on the frequency of a change in the amount of light of flicker detected by the detection unit at first timing before the continuous shooting is performed and the characteristic point of a change in the amount of light of flicker detected by the detection unit at second timing later than the first timing during continuous shooting, predict a characteristic point of a change in the amount of light of flicker after the second timing, and a control unit configured to control timing with which the image pickup device is exposed to coincident with the characteristic point after the second timing predicted by the predicting unit.

Accordingly, a second aspect of the present invention provides a method of detecting a change in an amount of environmental light in an image pickup apparatus, comprising a display step of displaying a live-view image on a display device using an image signal read out from an image pickup device, a first readout step of reading out an image signal of one frame from the image pickup device for detecting a frequency and a characteristic point of a change in the amount of light of flicker before continuous shooting is performed using the image pickup device, a first detection step of detecting a frequency and a characteristic point of the change in the amount of light of flicker based on the image signal readout in the first readout step, a second readout step of reading out an image signal of one frame from the image pickup device for detecting only a characteristic point of a change in the amount of light of flicker whenever image pickup for obtaining a still image of one frame is performed during continuous shooting, a second detection step of detecting a characteristic point of the change in the amount of light of flicker based on the image signal readout in the second readout step, wherein in the second readout step, based on a characteristic of a change in the amount of light of flicker detected at first timing, readout of a signal from the image pickup device is controlled so that a characteristic point of a change in the amount of light of flicker detected at second timing later than the first timing is positioned at a center of an image signal of one frame read out from the image pickup device.

Accordingly, a third aspect of the present invention provides a non-transitory computer-readable storage medium storing a program for causing a computer to execute a method of detecting a change in an amount of environmental light in an image pickup apparatus, the method of detecting a change in the amount of light comprising a display step of displaying a live-view image on a display device using an image signal read out from an image pickup device, a first readout step of reading out an image signal of one frame from the image pickup device for detecting a frequency and a characteristic point of a change in the amount of light of flicker before continuous shooting is performed using the image pickup device, a first detection step of detecting a frequency and a characteristic point of the change in the amount of light of flicker based on the image signal readout in the first readout step, a second readout step of reading out an image signal of one frame from the image pickup device for detecting only a characteristic point of a change in the amount of light of flicker whenever image pickup for obtaining a still image of one frame is performed during continuous shooting, a second detection step of detecting a characteristic point of the change in the amount of light of flicker based on the image signal readout in the second readout step, wherein in the second readout step, based on a characteristic of a change in the amount of light of flicker detected at first timing, readout of a signal from the image pickup device is controlled so that a characteristic point of a change in the amount of light of flicker detected at second timing later than the first timing is positioned at a center of an image signal of one frame read out from the image pickup device.

According to the present invention, a characteristic point of a change in the amount of light is detected using the image pickup device at the time of continuous shooting, and the shutter timing is made to coincide with the timing with which the amount of light peaks, which is predicted from the detected characteristic point. As a result, when continuous shots are taken at high shutter speed under an artificial light source with varying amounts of light, a still image with reduced effects of a change in the amount of light on a picked-up image is picked up without decreasing frame speed.

Further features of the present invention will become apparent from the following description of exemplary embodiments (with reference to the attached drawings).

DESCRIPTION OF THE EMBODIMENTS

Hereafter, an embodiment of the present invention will be described in detail with reference to the drawings. In the following description of the present embodiment, a digital single-lens reflex camera (hereafter referred to as "the digital camera") is taken as an example of an image pickup apparatus according to the present invention.

Figure 1:
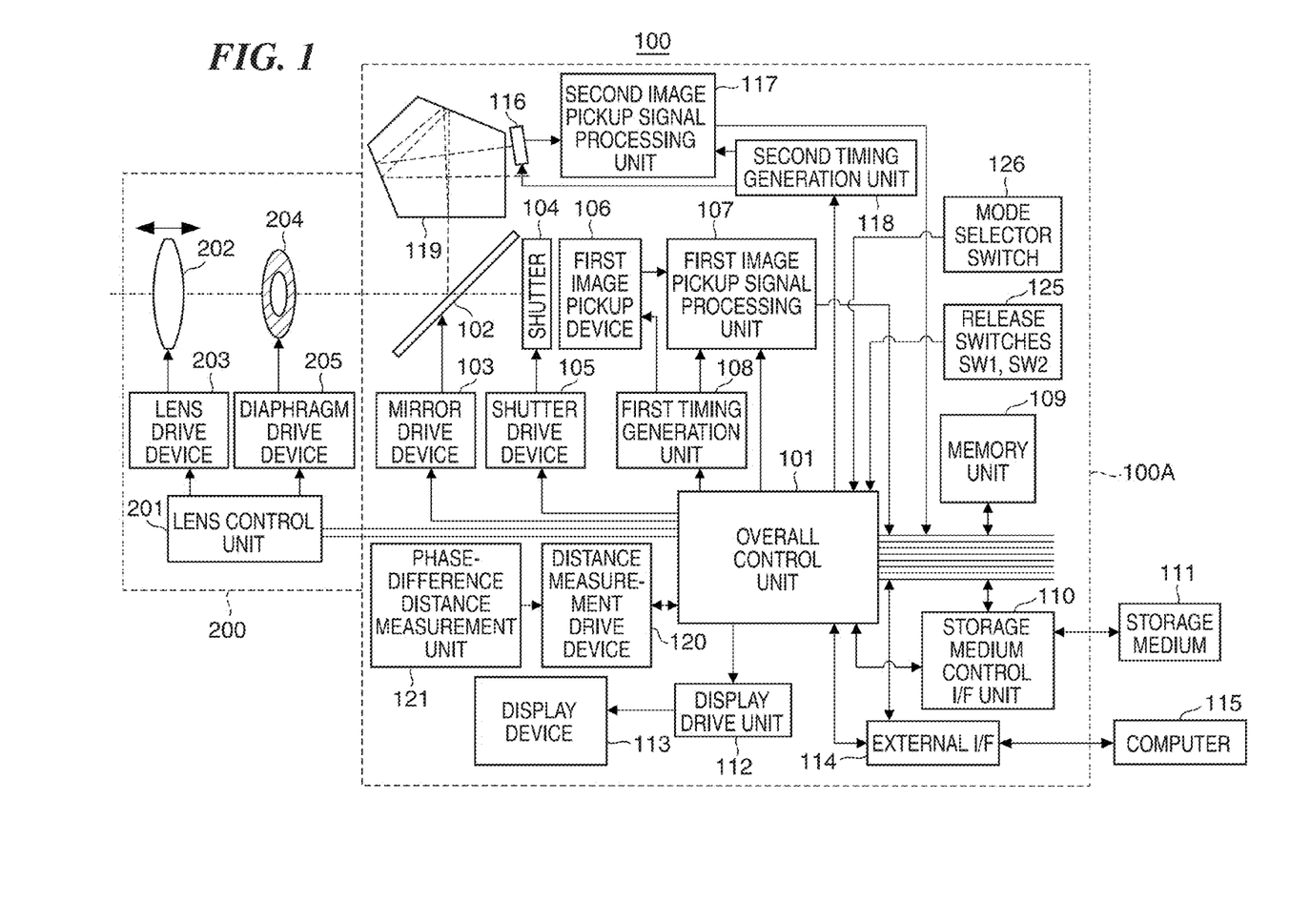
FIG. 1 is a block diagram schematically showing an arrangement of a digital camera according to an embodiment of the present invention.
Figure 2:
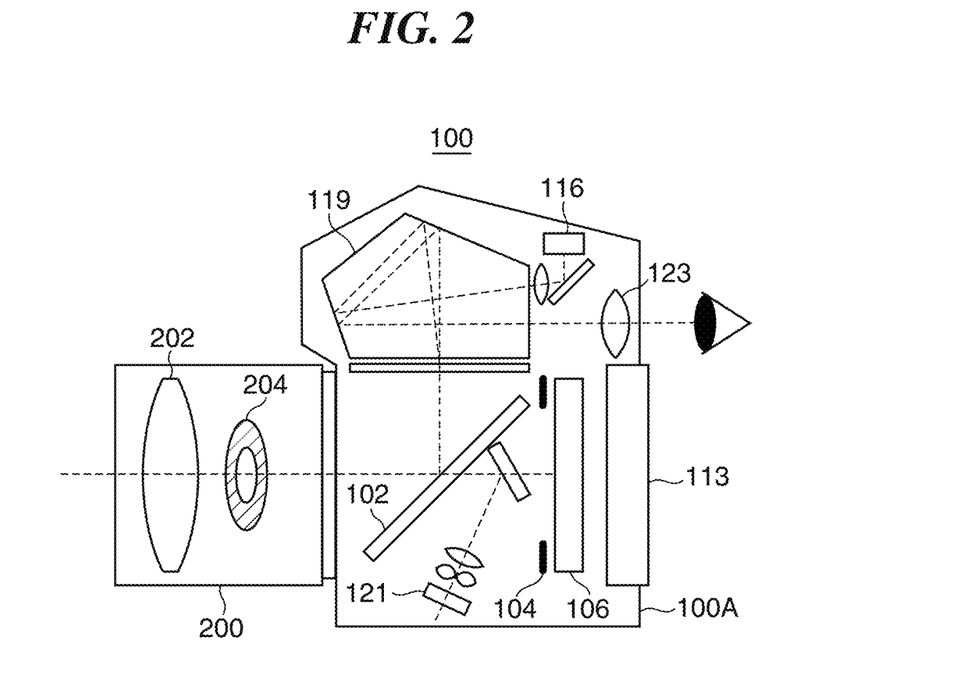
FIG. 2 is a cross-sectional view showing a layout of essential component elements of the digital camera in FIG. 1.

FIG. 1 is a block diagram schematically showing an arrangement of the digital camera 100 according to the embodiment of the present invention. FIG. 2 is a cross-sectional view showing a layout of essential component elements of the digital camera 100. It should be noted that one or more functional blocks shown in FIG. 1 may be implemented by hardware such as an ASIC or a programmable logic array (PLA) or may be implemented by a programmable processor such as a CPU or MPU executing software. Moreover, the one or more functional blocks shown in FIG. 1 may be implemented by a combination of software and hardware. Accordingly, in the following description, different functional blocks may be operated by the same hardware.

The digital camera 100 has a camera main body 100A and an interchangeable lens barrel 200, which is removable from the camera main body 100A. The camera main body 100A has an overall control unit 101, a mirror 102, a mirror drive unit 103, a shutter 104, a shutter drive device 105, a first image pickup device 106, a first image pickup signal processing unit 107, a first timing generation unit 108, and a memory unit 109. The camera main body 100A also has a storage medium control I/F unit 110, a display drive unit 112, a display device 113, an external interface 114, a second image pickup device 116, a second image pickup signal processing unit 117, and a second timing generation unit 118. Further, the camera main body 100A has a pentaprism 119, a distance measurement drive device 120, a phase-difference distance measurement unit 121, an eyepiece 123, a release switch 125, and a mode selector switch 126.

The overall control unit 101 e.g. a microprocessor including a CPU controls the overall operation of the digital camera 100 (the camera main body 100A and the interchangeable lens barrel 200). It should be noted that in a case where a lens control unit is provided in the interchangeable lens barrel 200 side, the overall control unit 101 performs at least overall control of the camera main body 100A. In a state in FIG. 2 at the time of photometry, the mirror 102, which is generally called a quick return mirror, guides light that has passed through the interchangeable lens barrel 200 toward a finder, and at the time of image pickup, swings up to guide the light to the first image pickup device 106. The mirror drive unit 103 drives the mirror 102. The shutter 104, which is a shutter mechanism corresponding to focal-plane front- and rear-curtains, controls the time period over which the first image pickup device 106 is exposed to light that has passed through the interchangeable lens barrel 200, and also shields light. The shutter drive device 105 drives the shutter 104.

Light that has passed through the interchangeable lens barrel 200 forms an optical image of a subject on a surface of the first image pickup device 106. The first image pickup device 106 converts the optical image into an electric signal (image signal) and outputs the electric signal to the first image pickup signal processing unit 107. The first image pickup device 106 is specifically a CMOS sensor which employs an X-Y address scheme. The first image pickup signal processing unit 107 carries out, for example, a process to amplify an image signal output from the first image pickup device 106, a process to convert an analog signal into a digital signal (A/D conversion), a variety of correction processes such as a defect correction on image data that has been subjected to A/D conversion, and a process to compress image data. The first timing generation unit 108 supplies a variety of timing signals to the first image pickup device 106 and the first image pickup signal processing unit 107.

The memory unit 109 is comprised of a RAM which temporarily stores, for example, image data processed by the first image pickup signal processing unit 107, a ROM which stores, for example, a variety of adjustment values and programs for causing the overall control unit 101 to provide various types of control, and so on. The storage medium control I/F unit 110 carries out a process to write image data or the like into the storage medium 111, and a process to read out image data or the like from the storage medium 111. The storage medium 111 is, for example, a semiconductor memory which stores a variety of data such as image data and is removable from the camera main body 100A.

The display device 113 is, for example, a liquid crystal display which displays still images and moving images obtained by image pickup, live-view images (hereafter referred to as "LV images"), a menu screen (UI) for determining shooting conditions of the camera main body 100A, and so forth. The display drive unit 112 drives the display device 113. The external interface 114 is an interface for enabling transmission and reception of information such as image signals and control signals between a computer 115, which is an exemplary external apparatus, and the overall control unit 101.

The second image pickup device 116, which acts as an AE sensor, is a photoelectric conversion element for obtaining AE signal/light source detection signals and is a sensor with RGB color filters arranged in a Bayer pattern. As the second image pickup device 116, a CCD sensor with a global electronic shutter function is generally used, but even a CMOS sensor may be used as long as its readout speed is high (as long as its readout time is short). The second image pickup signal processing unit 117 carries out, for example, an amplification process and an A/D conversion process on an image signal output from the second image pickup device 116, a variety of correction processes such as defect correction on image data that has been subjected to A/D conversion, a compression process to compress image data. The second timing generation unit 118 supplies a variety of timing signals to the second image pickup device 116 and the second image pickup signal processing unit 117.

The pentaprism 119 is a member for guiding light bent by the mirror 102 to the eyepiece 123 of the finder and the second image pickup device 116. The phase-difference distance measurement unit 121 obtains two images, phases of which vary with defocusing amounts of a subject, from a ray of light that has passed through the mirror 102 and computes the amount of defocus of a subject from the amount of misalignment of the two images. The distance measurement drive device 120 drives the phase-difference distance measurement unit 121.

The release switch 125 has an SW1 that is turned on when depressed halfway, and an SW2 that is turned on when depressed all the way down. In response to turning-on of the SW1, detection of a frequency of, so called flicker which shows a change in the amount of light at a predetermined cycle under the artificial light source such as a fluorescent light and a characteristic point (a peak or a bottom) of the change in the amount of light as well as automatic exposure and automatic focusing is performed, and in response to turning-on of the SW2, the first image pickup device 106 picks up an image. While the SW2 is kept on, an operation to continuously obtain an image (data) for a still image in a state where the SW2 is on (hereinafter, merely referred to as continuous shooting) is performed, and during continuous shooting, only a characteristic point of flicker is detected each time a still image of one frame is taken. The mode selector switch 126 is for the user to determine whether to pick up an image through the finder or to pick up an image in a state where an LV image is displayed on the display device 113.

The interchangeable lens barrel 200 has a lens control unit 201, an image pickup lens 202, a lens drive device 203, a diaphragm 204, and a diaphragm drive device 205. An optical image of a subject guided to the camera main body 100A side by the second pickup lens 202 is formed on the first image pickup device 106. Based on the amount of defocus calculated by the phase-difference distance measurement unit 121, the lens drive device 203 moves the image pickup lens 202 in a direction of an optical axis and brings a subject into focus. The diaphragm 204 adjusts the amount of light passing through the image pickup lens 202 corresponding to an optical image of a subject. The diaphragm drive device 205 drives the diaphragm based on a photometric value obtained from an output from the second image pickup device 116 which acts as an AE sensor. The lens control unit 201 carries out communications with the overall control unit 101 to control operation of the interchangeable lens barrel 200 in accordance with instructions from the overall control unit 101.

Figure 3:
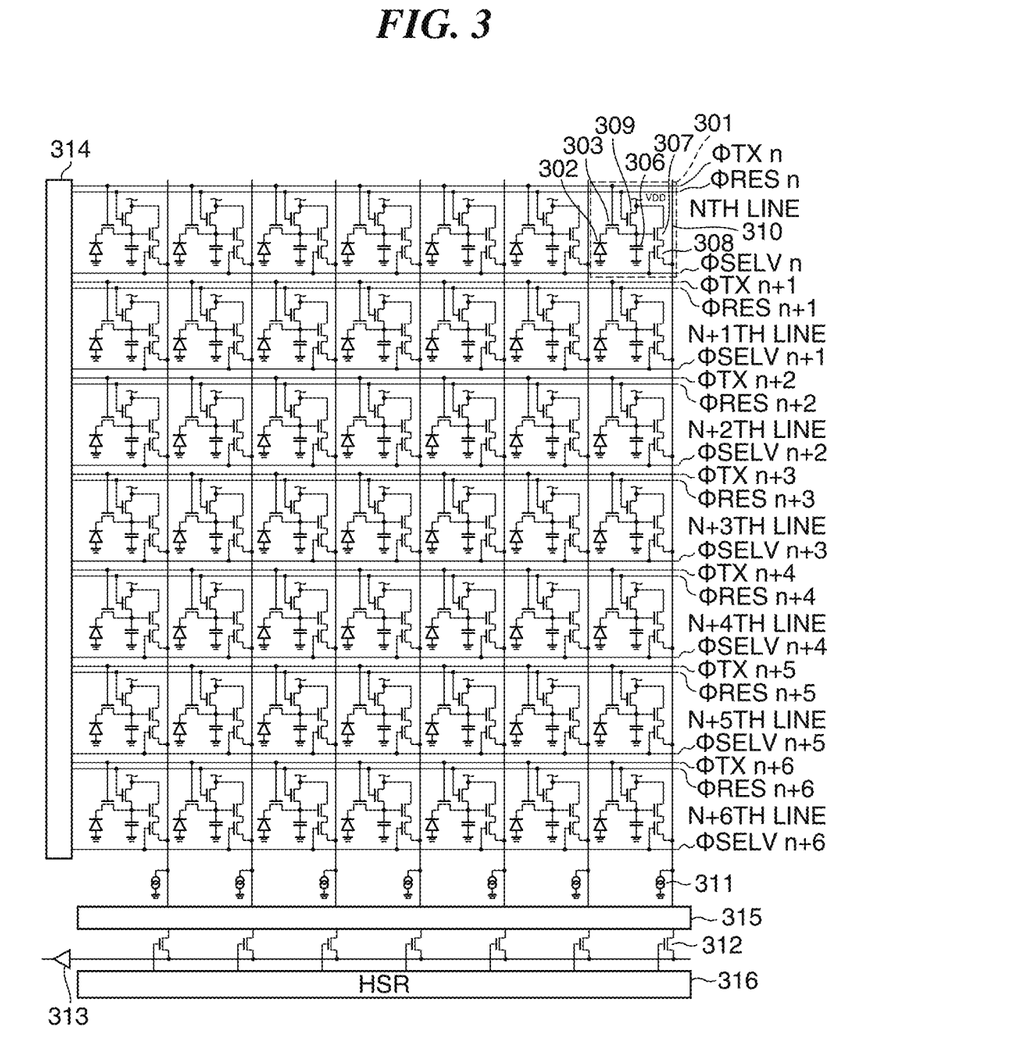
FIG. 3 is a diagram schematically showing an arrangement of a first image pickup device which the digital camera in FIG. 1 has.
Figure 4:
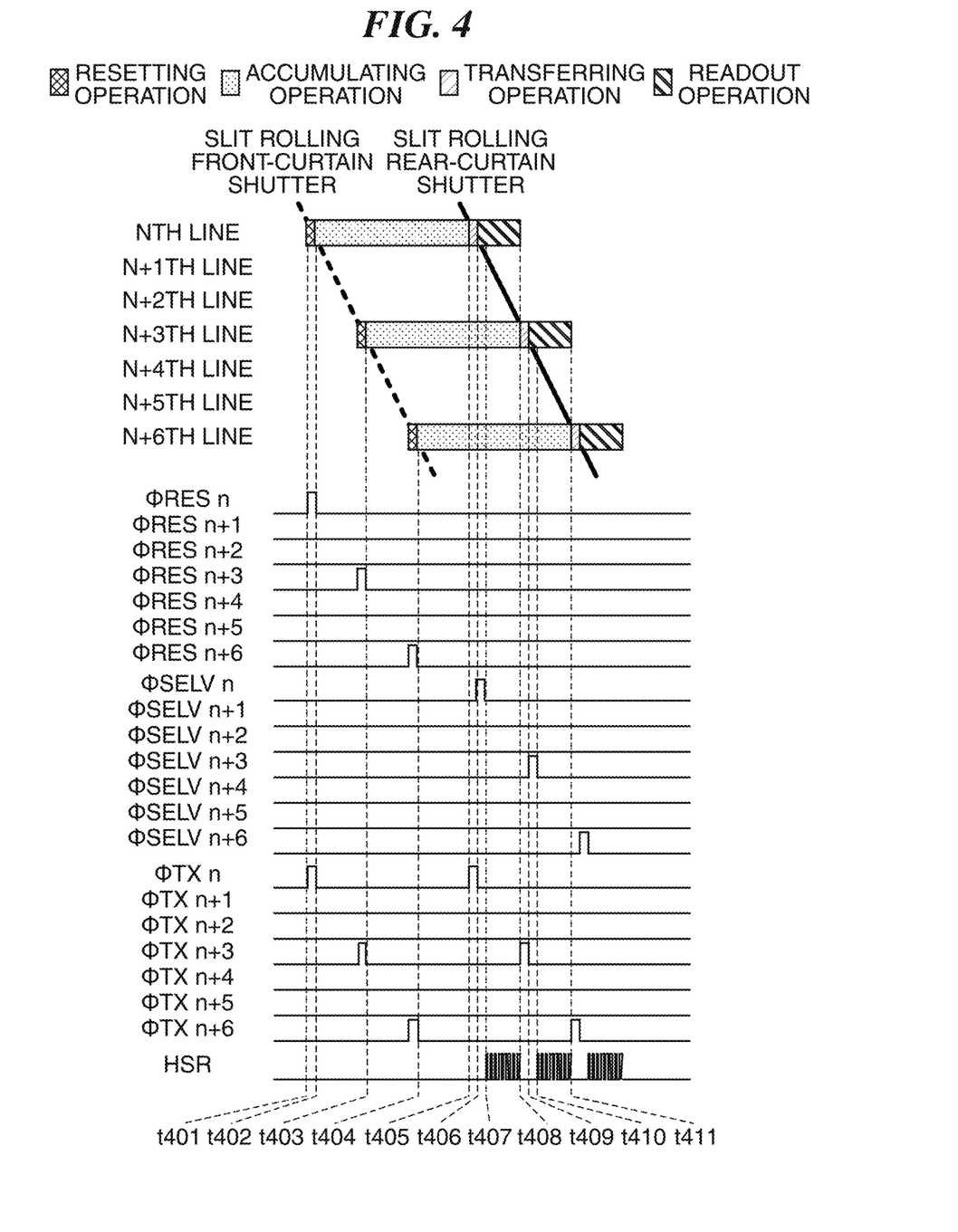
FIG. 4 is a diagram useful in explaining a slit rolling shutter operation using the first image pickup device which the digital camera in FIG. 1 has.
Figure 5:
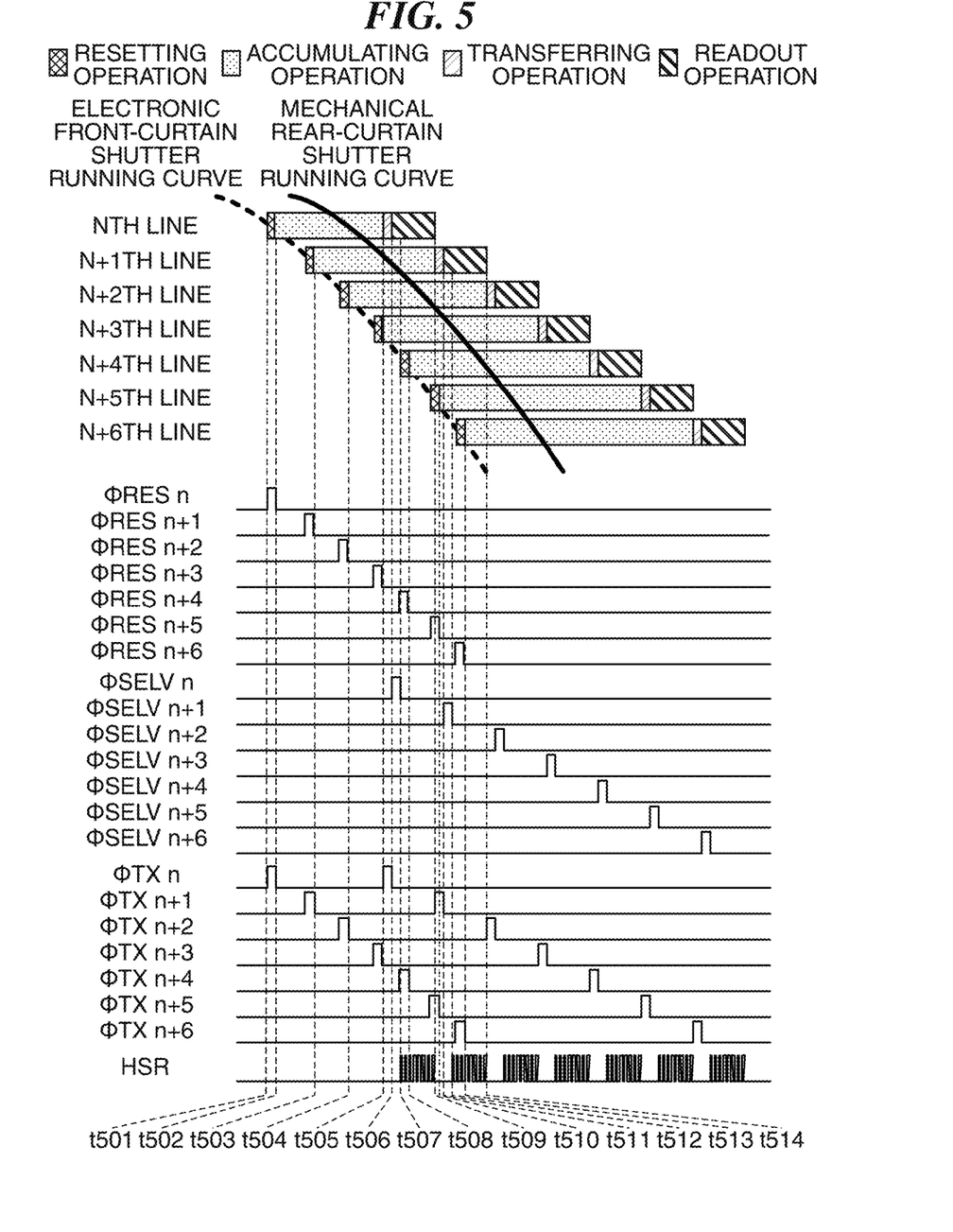
FIG. 5 is a diagram useful in explaining a shutter operation using an electronic front-curtain shutter and a mechanical rear-curtain shutter and how the first image pickup device operates in the digital camera in FIG. 1.

Before a description is given of an image pickup operation by the digital camera 100 when an image is picked up with an LV image being displayed on the display device 113, a description will given of an arrangement of the first image pickup device 106 and how the first image pickup device 106 is exposed to light with reference to FIGS. 3 to 5.

FIG. 3 is a diagram schematically showing an arrangement of the first image pickup device 106. The first image pickup device 106 is a CMOS sensor that employs an X-Y address scanning scheme. The first image pickup device 106 is configured to have an arrangement in which a predetermined number of pixels 301, which are units to be driven, are arranged in each of vertical and horizontal directions. The pixels 301 each have a photodiode (hereafter referred to as "the PD") 302, a transfer switch 303, a floating diffusion (hereafter referred to as "the FD") 306, a MOS amplifier 307, a selector switch 308, and a reset switch 309.

The PD 302 converts light into electric charge. The FD 306 is an area where electric charge is temporarily accumulated. The transfer switch 303 transfers electric charge generated by the PD 302 to the FD 306 in response to a transfer pulse φTX. The MOS amplifier 307 acts as a source follower. The selector switch 308 selects a pixel in response to a selection pulse φSELV. The reset switch 309 clears electric charge, which is accumulated in the FD 306, in response to a reset pulse φRES.

The first image pickup device 106 has a signal output line 310, a constant current source 311, a selector switch 312, an output amplifier 313, a vertical scanning circuit 314, a readout circuit 315, and a horizontal scanning circuit 316. The constant current source 311 is a load on the MOS amplifier 307. The readout circuit 315 converts electric charge accumulated in the FD 306 of the pixel 301 selected by the selector switch 308 into voltage through charge-to-voltage conversion by the MOS amplifier 307 and the constant current source 311 and then reads out the voltage as pixel data (pixel signal) via the signal output line 310. The horizontal scanning circuit 316 drives the selector switch 312. The selector switch 312 selects pixel data readout by the readout circuit 315. The pixel data selected by the selector switch 312 is amplified by the output amplifier 313 and output from the first image pickup device 106.

The vertical scanning circuit 314 selects the transfer switch 303, the selector switch 308, and the reset switch 309. It is assumed here that as for a transfer pulse ϕTX, a reset pulse ϕRES, and a selection pulse ϕSELV, the nth scanning lines scanned and selected by the vertical scanning circuit 314 are designated as ϕTXn, ϕRESn, and ϕSELVn, and the n+1th scanning lines scanned and selected by the vertical scanning circuit 314 are designated as ϕTXn+1, ϕRESn+1, and ϕSELVn+1. In FIG. 3, only the nth to n+6th scanning lines are shown for the sake of convenience. The FD 306, the amplification MOS amplifier 307, and the constant current source 311 constitute a floating diffusion amplifier. It should be noted that when readout in the slit rolling shutter system is performed in the first image pickup device 106, it is defined that a direction substantially parallel to an nth line is a row direction and a direction perpendicular to the row direction is a column direction.

FIG. 4 is a view useful in explaining slit rolling shutter operations using a front-curtain shutter that is electronic (hereafter referred to as "the electronic front-curtain shutter") and a rear-curtain shutter that is electronic in the first image pickup device 106 (hereafter referred to as "the electronic rear-curtain shutter").

When the electronic front-curtain shutter runs, in the nth scanning line, a pulse is applied to ϕRESn and ϕTXn from a time t401 to a time t402 to turn on the transfer switch 303 and the reset switch 309 (resetting operation). As a result, the resetting operation is carried out by clearing unnecessary electric charge accumulated in the PD 302 and the FD 306 in the nth scanning line. Then, at the time t402, application of the pulse to ϕRESn and ϕTXn is terminated to turn off the transfer switch 303 and the reset switch 309, and accumulation of electric charge generated in the PD 302 in the nth scanning line is started (accumulating operation).

The n+1 scanning line and the n+2 scanning line are not used as images, and hence no processing is performed here on those lines. It should be noted that since electric charge accumulated in the PD 302 may leak to peripheral pixels, ϕRESn and ϕTXn in the n+1 scanning line and the n+2 scanning line should be turned on to constantly reset electric charge in the PD 302.

At a time t403, the accumulating operation in the n+3 scanning line is started as with the time t402, and at a time 404, the accumulating operation in the n+6 scanning line is started. By thus cancelling the reset state and starting accumulation of electric charge successively in scanning lines at regular time intervals, the electric front-curtain shutter operation is accomplished.

Returning to the nth scanning line, a pulse is applied to ϕTXn from a time t405 to a time t406 to turn on the transfer switch 303, so that electric charge accumulated in the PD 302 is transferred to the FD 306 (transferring operation). After the transferring operation in the nth scanning line is finished, a pulse is applied to ϕSELVn from the time t406 to a time t407 to turn on the selector switch 308. As a result, electric charge held in the FD 306 is converted into voltage and output as pixel data to the readout circuit 315 (readout operation). The pixel data temporarily held in the readout circuit 315 starts to be successively output by the horizontal scanning circuit 316 at the time t407. Then, at a time t408, readout of the pixel data from the pixels in the nth line is completed.

In the n+3th scanning line, a pulse is applied to ϕTXn+3 from the time t408 to a time t409 to turn on the transfer switch 303, so that the transferring operation is performed to transfer electric charge accumulated in the PD 302 to the FD 306. After the transferring operation in the n+3th scanning line is finished, a pulse is applied to ϕSELVn+3 from the time t409 to a time t410 to turn on the selector switch 308, causing electric charge held in the FD 306 to be converted into voltage and output as pixel data to the readout circuit 315. The pixel data temporarily held in the readout circuit 315 starts to be successively output by the horizontal scanning circuit 316 at the time t410. Then, at a time t411, readout of the pixel data from pixels in the n+3th scanning line is completed. By thus transferring and reading out electric charge at regular time intervals, the electric rear-curtain shutter operation is accomplished. It should be noted that the time from the completion of resetting of the PD 302 to the start of the transferring opera on in each scanning line corresponds to an exposure time for each pixel.

FIG. 5 is a diagram useful in explaining a shutter operation using the electronic front-curtain shutter and a rear-curtain shutter that is mechanical (hereafter referred to as "the mechanical rear-curtain shutter"), and how the first image pickup device 106 operates. It should be noted that the mechanical rear-curtain shutter is a rear-curtain shutter of the shutter 104.

When the electronic front-curtain shutter runs, in the nth scanning line, a pulse is applied to ϕRESn and ϕTXn from a time t501 to a time t502 to turn on the transfer switch 303 and the reset switch 309. As a result, the resetting operation is carried out by clearing unnecessary electric charge accumulated in the PD 302 and the FD 306 in the nth scanning line. Then, at the time t502, application of the pulse to ϕRESn and ϕTXn is terminated to turn off the transfer switch 303 and the reset switch 309, and accumulation of electric charge generated in the PD 302 in the nth scanning line is started.

Likewise, accumulation of electric charge in the n+1th scanning line is started at a time t503, accumulation of electric charge in the n+2th scanning line is started at a time t504, and accumulation of electric charge in the n+3th scanning line is started at a time t505. Further, accumulation of electric charge in the n+4th scanning line is started at a time t508, accumulation of electric charge in the n+5th scanning line is started at a time t510, and accumulation of electric charge in the n+6th scanning line is started at a time t513. By thus successively canceling the reset state and starting accumulation of electric charge in scanning lines, the electric front-curtain shutter operation is accomplished.

Subsequently, the mechanical rear-curtain shutter is run. The time between the electric front-curtain shutter and the mechanical rear-curtain shutter is en exposure time, and the reset timing of the electric front-curtain shutter is controlled so that the amount of light exposure in each scanning line can be appropriate. It should be noted that in FIG. 5, the accumulating operation continues for a certain time period after the mechanical rear-curtain shutter is run, but after the mechanical rear-curtain shutter is run, light is shielded, and hence no electric charge is accumulated even if the accumulating operation is performed.

Returning here to the nth scanning line, a pulse is applied to ϕTXn from the time t505 to a time t506 to turn on the transfer switch 303, so that the transferring operation is performed to transfer electric charge accumulated in the PD 302 to the FD 306. After the transferring operation in the nth scanning line is finished, a pulse is applied to ϕSELVn from the time t506 to a time t507 to turn on the selector switch 308, causing electric charge held in the FD 306 to be converted into voltage and output as pixel data to the readout circuit 315. The pixel data temporarily held in the readout circuit 315 starts to be successively output by the horizontal scanning circuit 316 at a time t507. Then, at a time t509, readout of the pixel data from the pixels in the nth line is completed.

In the n+1th scanning line, a pulse is applied to φTXn+1 from the time t509 to a time t511 to turn on the transfer switch 303, so that the transferring operation is performed to transfer electric charge accumulated in the PD 302 to the FD 306. After the transferring operation in the n+1th scanning line is finished, a pulse is applied to φSELVn+1 from the time t511 to a time t512 to turn on the selector switch 308, causing electric charge held in the FD 306 to be converted into voltage and output as pixel data to the readout circuit 315. The pixel data temporarily held in the readout circuit 315 starts to be successively output by the horizontal scanning circuit 316 at a time t512. Then, at a time t513, readout of the pixel data from pixels in the n+1th scanning line is completed.

A description will now be given of how the digital camera 100 detects a change in the amount of environmental light and picks up images at the time of continuous shooting, described above, in a state where an LV image is displayed on the display device 113.

Figure 6:
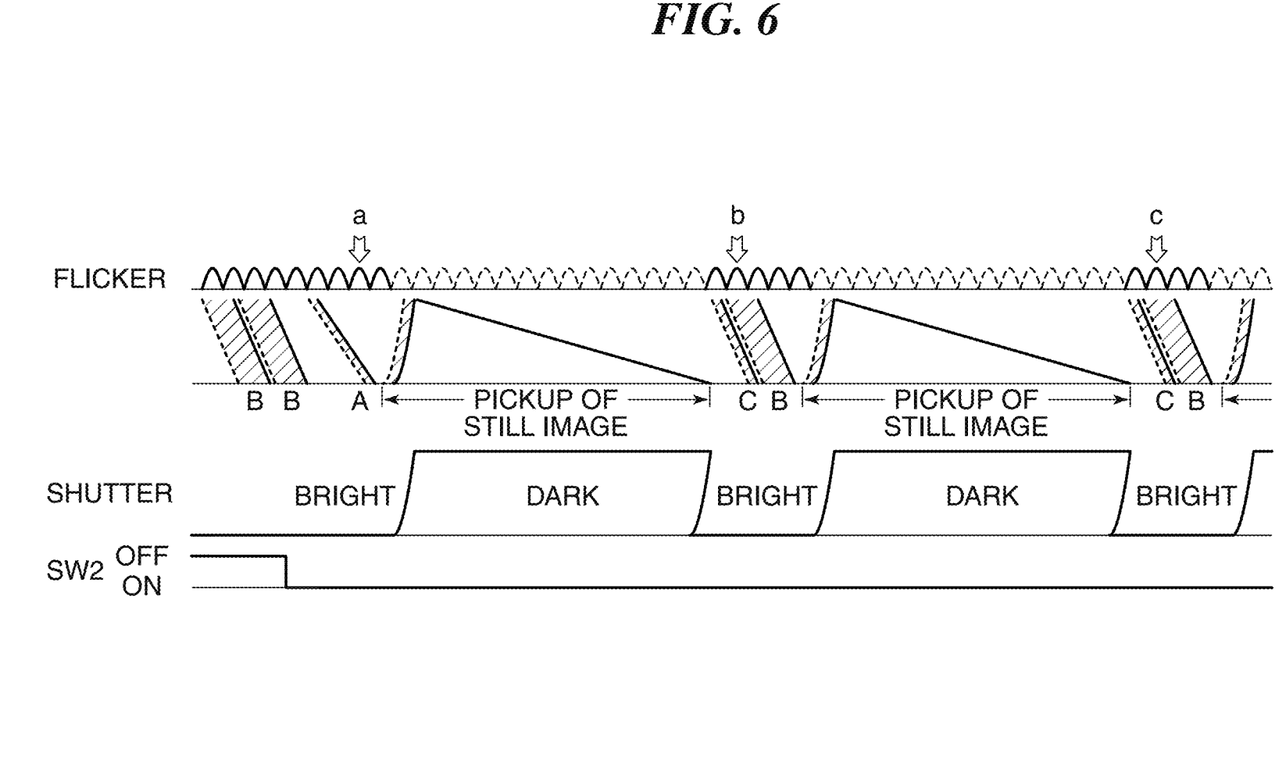
FIG. 6 is a timing chart useful in explaining a continuous shooting operation that is started in a state where an live-view image is displayed on a display device in the digital camera in FIG. 1 under a flickering light source.

FIG. 6 is a timing chart useful in explaining how a change in the amount of environmental light is detected, and image pickup for obtaining a plurality of still images by continuous shooting is performed in a state where an LV image is displayed on the display device 113 under a flickering light source. Before the SW2 is turned on by depressing the release switch 125 all way down, the overall control unit 101 displays an LV image on the display device 113 based on an image signal read out from the first image pickup device 106 under such an exposure condition B that there is no unevenness of exposure (stripes) caused by a change in the amount of light of flicker. In this case, exposure time is controlled by accumulation over a time period that corresponds to an integral multiple of a flicker cycle and includes at least two cycles of flicker or by accumulation over a time period sufficiently longer than a flicker cycle. The obtainment of the LV image at this time is accomplished by so called slit rolling shutter using the electronic front-curtain shutter and the electronic rear-curtain shutter described with reference to FIG. 4, and under the exposure condition B, an image B in FIG. 7A, to be described later, is obtained.

When the SW2 is turned on, the overall control unit 101 changes exposure conditions from the exposure condition B to an exposure condition A with timing a and reads out an image signal (data) of one frame from the first image pickup signal 106 to thus intentionally obtain an image A in which unevenness of exposure caused by a change in the amount of light of flicker. Accordingly, stripes which differ in brightness in a vertical direction (short direction) arise in the image A. In this case, exposure time is controlled by exposing each scanning line to light for a shorter time period than a cycle of a change in the amount of light of flicker (hereinafter, merely referred to the cycle) to intentionally cause unevenness of exposure arising from flicker. At this time, the overall control unit 101 does readout over a relatively long time period corresponding to two to three flicker cycles so as to detect a flicker frequency (cycle) and a flicker peak (a position on a time axis at which the amount of light is the greatest).

The obtainment of the image A is accomplished by slit rolling shutter using the electronic front-curtain shutter and the electronic rear-curtain shutter described with reference to FIG. 4, and under the exposure condition A, the image A in FIG. 7A, to be described later, is obtained. The image A, however, is not displayed on the display device 113, and hence nothing is displayed on the display device 113. This is to prevent the user from, for example, by looking at an image with a stripe pattern displayed on the display device 113, determining that a failure has occurred. The state where nothing is displayed on the display device 113 is continued until continuous shooting ends (while the SW2 is on), and when continuous shooting ends (when the SW2 is turned off), this state is brought to an end.

Figure 7A:
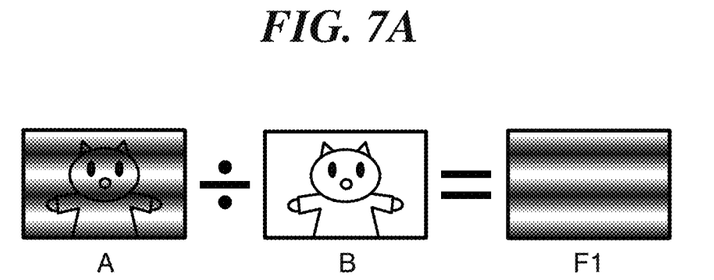
FIGS. 7A and 7B are diagrams schematically showing a method to find a cycle and a peak of flicker from images B and A obtained under respective exposure conditions B and A in FIG. 6.
Figure 7B:
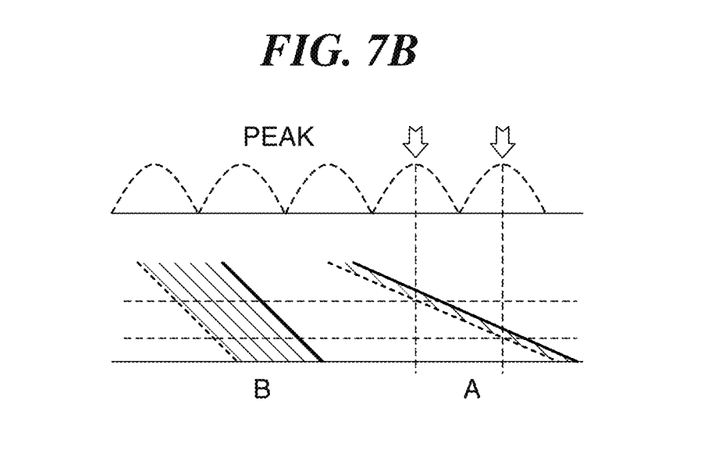

FIGS. 7A and 7B are diagrams schematically showing a method to find a flicker cycle and a flicker peak from the images B and A obtained under the exposure conditions B and A, respectively. Under the exposure condition B, the accumulation time is approximately an integral multiple of a flicker cycle, and hence under the exposure condition B, whatever the timing of image obtainment, the image B with no stripes arising from flicker is obtained. On the other hand, under the exposure condition A, the accumulation time is shorter than a flicker cycle, the obtained image A has stripes arising from flicker. Further, under the exposure condition A, the readout time is long, and hence a plurality of stripes appears in the image A (a first readout step). In other words, a readout time which causes a plurality of stripes to arise in the image A is set for the exposure condition A, and in the present embodiment, a readout time of accumulated charge under the exposure condition A is longer than a readout time of accumulated charge under the exposure condition B.

By dividing the image A with stripes arising from flicker therein by the image B with no stripes arising from flicker therein, an image F1 with reduced effect other than stripes is obtained. In the image F1, a center of a band that looks white corresponds to a flicker peak. The timing with which flicker peaks is found from the image F1, and based on a temporal difference between a peak time and a peak time, a frequency (cycle) of flicker is calculated (a first detection step).

Figure 8:
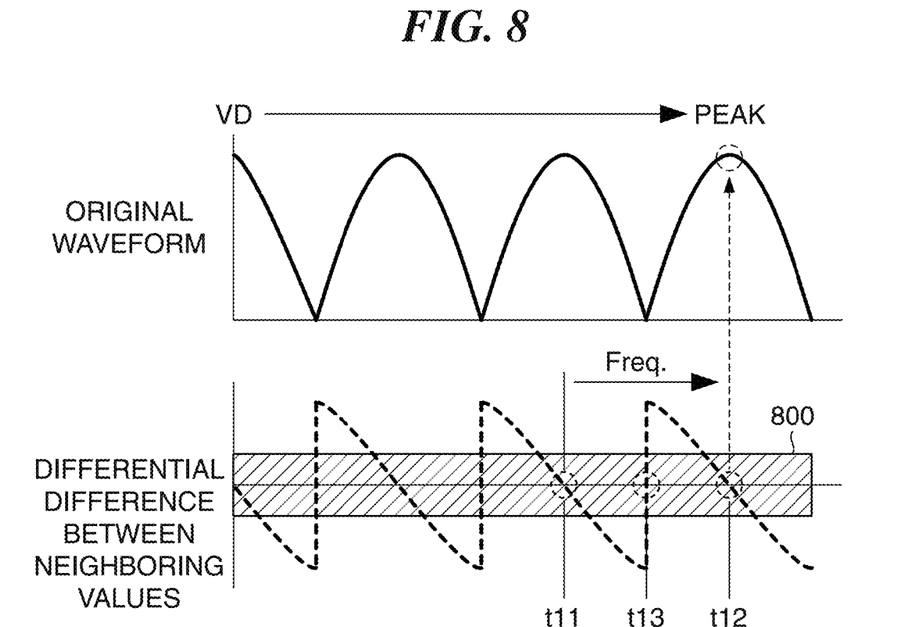
FIG. 8 is a diagram useful in schematically explaining a method to calculate a frequency (cycle) of flicker from an image F1 in FIG. 7A.

FIG. 8 is a diagram useful in schematically explaining a method to calculate a frequency (cycle) of flicker from the image F1. It is difficult to detect a peak, which is one of characteristic points, from a waveform of flicker obtained from the image F1 as it is, and hence a differential value (difference between neighboring values) of the original waveform is obtained to find times t11 and t12 at which its differential waveform reaches zero (0), and they correspond to times at which flicker peaks. A temporal difference between the times t11 and t12 is obtained as a flicker cycle. Namely, the overall control unit 101 obtains an interval between successive two points at which the differential value is zero as a cycle of a change in the amount of light of flicker.

It should be noted that in FIG. 8, the waveform of flicker is illustrated as a typical sine wave (a waveform with its negative side reversed to a positive side so as to be expressed as the intensity of light). However, a waveform of flicker that is actually obtained includes noise, and a differential waveform may reach zero at three or more times within one cycle due to, for example, the waveform losing accuracy. This can be coped with by, for example, using a low-pass filter for removing noise of light incident on the first image pickup device 106 and exposing the first image pickup device 106 to light passing through this low-pass filter. However, an area 800 (an area where a value of a differential waveform reaches zero), which is required to detect the timing with which flicker peaks, needs to be included in the image A. It should be noted that when a differential waveform is used, a time t13 at which the differential waveform reaches a bottom, which is one of characteristic points of flicker, may be easier to detect. In this case, temporal differences among the times t11, t12, and t13 should be calculated in advance, and during continuous shooting, peak timing should be calculated by detecting bottom timing. Moreover, both a peak and a bottom are detected as characteristic points of flicker and based on a detection result, a cycle of a change in the amount of light of flicker may be further accurately calculated.

Figure 9:
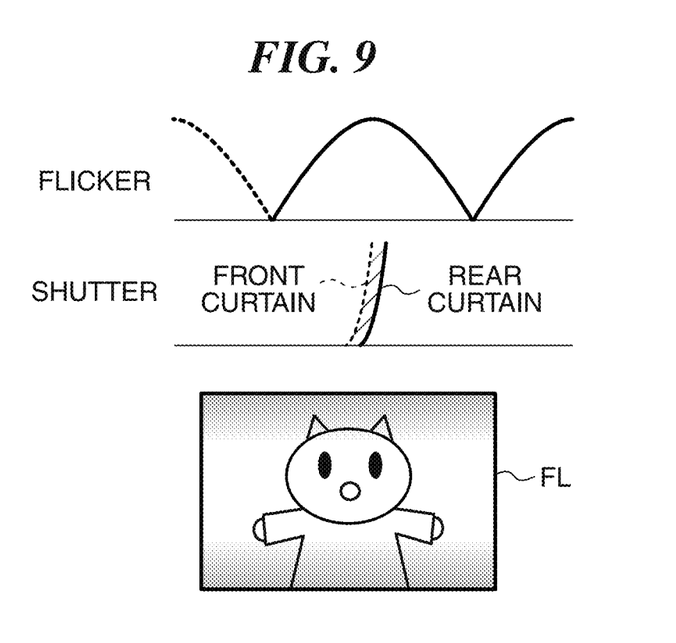
FIG. 9 is a diagram useful in explaining shutter timing with which a first still image is picked up after the image A is obtained under the exposure condition A in FIG. 6.

FIG. 9 is a diagram useful in explaining the shutter timing for picking up a first still image after the image A is obtained under the exposure condition A. As described above with reference to FIGS. 7A and 7B, a cycle and a characteristic point of flicker have already been found by obtaining the image A. Accordingly, the overall control unit 101 predicts the timing with which flicker peaks after the characteristic point of flicker detected by pickup of the image A. The overall control unit 101 then picks up a still image by controlling the shutter operation using the electronic front-curtain shutter and the mechanical rear-curtain shutter described with reference to FIG. 5 so that the predicted peak timing and the shutter timing can be coincident with each other. As a result, a still image FL with less flicker (with reduced effect of flicker) is obtained. It should be noted that "PICKUP OF STILL IMAGE" in FIG. 6 indicates a shutter operation performed to obtain the still image FL and readout of electric charge (image signal) from the first image pickup device 106.

Then, when pickup of the first still image is brought to an end by turning on the SW2, the overall control unit 101 obtains, in order to perform continuous shooting, an image C of one frame with timing b under an exposure condition C that causes stripes arising from unevenness of exposure caused by flicker to appear. The overall control unit 101 also obtains the image B of one frame with no stripes under the exposure condition B.

Here, if a long time is spent so as to obtain an image in which a stripe including, for example, at least two peaks of flicker appear during continuous shooting, frame speed will decrease. Thus, in order to detect at least a flicker peak, the image C with a stripe arising from unevenness of exposure caused by flicker under the exposure condition C (for example, a waveform of flicker longer than one cycle and shorter than two cycles of a cycle of change in the amount of light of flicker) that is a shorter time period than that of the exposure condition A is obtained. It should be noted that the exposure condition B for obtaining the image B may be the same as the condition for obtaining an LV image.

Figure 10A:
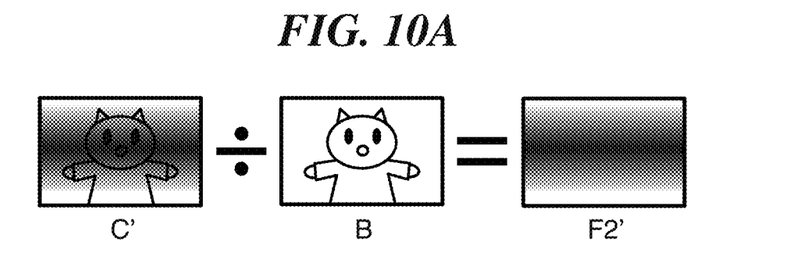
FIGS. 10A to 10D are diagrams schematically showing a method to obtain a peak of flicker based on images obtained under respective exposure conditions C and B in FIG. 6.
Figure 10B:
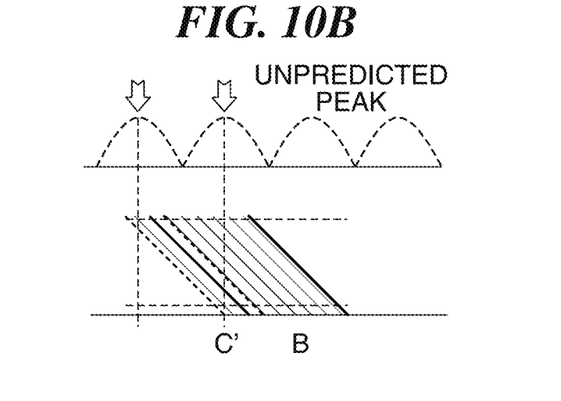

FIGS. 10A to 10D are diagrams schematically showing a method to obtain a peak of flicker based on images obtained under the respective exposure conditions C and B in FIG. 6. FIGS. 10A and 10B show an image C', in which flicker peaks at upper and lower ends of a screen, as an exemplary image obtained by, after previous pickup of a still image, performing light exposure under the exposure condition C with no consideration given to previously-detected flicker peak timing (hereafter referred to as "the exposure condition C'"). When light exposure is performed under the exposure condition C with no consideration given to a flicker cycle and peak timing after previous pickup of a still image, it is not known where flicker peaks within a screen.

Dividing the image C' by the image B obtains an image F2' (a second readout step). In the image F2', it is difficult to determine whether a bright area is at a peak, is increasing brightness, or is decreasing brightness, and hence the timing with which flicker peaks may be misjudged. Therefore, after previous pickup of a still image, if an image with flicker is obtained with random timing while no consideration is given to a flicker cycle detected last time, a situation where it is impossible to detect a peak of flicker may arise.

Figure 10C:
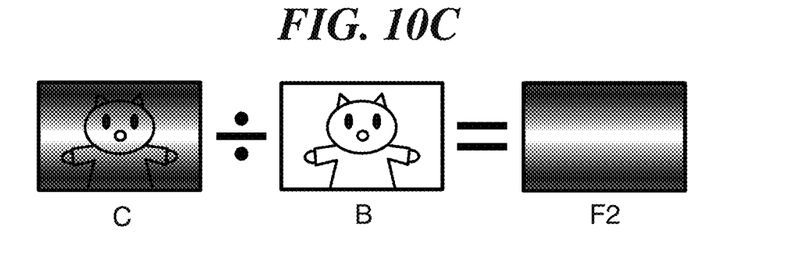
Figure 10D:
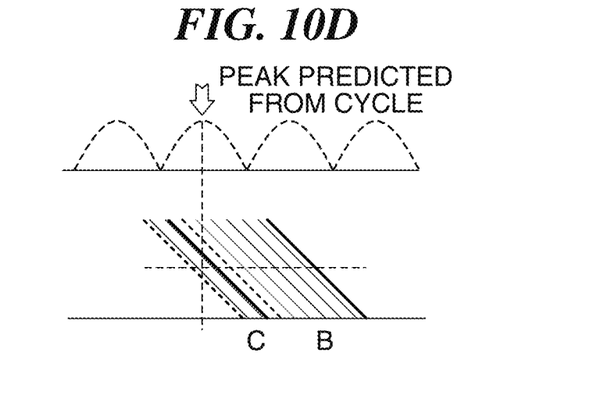

On the other hand, FIGS. 10C and 10D show an image C, in which flicker peaks substantially at a center of a screen, as an exemplary image obtained by, after previous pickup of a still image, light exposure is performed under the exposure condition C with consideration given to peak timing of flicker detected last time. Here, based on the peak timing of flicker detected last time, the timing with which flicker peaks after the flicker peak detected last time (first timing) is predicted, and the timing of light exposure is controlled so that a flicker peak detected this time (second timing later than the first timing) can be positioned at a center of an image in a vertical direction (corresponding to the column direction in the image pickup device 106). Specifically, where a flicker peak time detected with the timing a (the flicker peak detected last time) is "t1", and a flicker cycle is "T", flicker peak timing t2 after the time a is expressed by the equation, $t2=t1+T\times n$ (n is an integer). Thus, by using the exposure condition C controlled so that a time at which light exposure is substantially half finished since the start of light exposure can be coincident with the time t2, the image C in which flicker peaks substantially at the center of the screen is obtained (a second readout step).

A peak of flicker is accurately detected from an image F2 obtained by dividing the image C by the image B (a second detection step). Thus, based on the frequency of flicker found before the image C is obtained, and the peak of flicker obtained from the image F2, the overall control unit 101 controls the shutter operation so that the time at which flicker peaks and the time at which the shutter releases for image pickup for obtaining a still image can be coincident with each other. As a result, the still image FL with reduced flicker in FIG. 9 is obtained.

As shown in FIG. 6, a still image of one frame is picked up after flicker is detected with the timing b. After that, with timing c, the images C and B are obtained in the same way as in the process performed with the timing b. Thus, while the state where the SW2 is depressed is continued, the timing with which flicker peaks is detected whenever an instruction to perform image pickup for obtaining a still image for recording desired by a user.

It should be noted that at the time point when the image C' in FIG. 10A is obtained, a flicker cycle has already been known. Therefore, by identifying a dark position (a bottom of flicker) in a central part of the image C' and determining a position shifted a 1/2 cycle from that position as a peak of flicker, the image C in which flicker peaks substantially at the center of the screen is obtained. However, some flicker light sources may not be in a form expressed by a typical sine wave and with its bottom pointed as described by referring to FIG. 8, but may be flat (a dark condition continues for a predetermined time period), and in this case, it is difficult to identify an exact position of a flicker bottom. Therefore, the method that directly identifies a flicker peak is allowed to be employed without being dependent on the property of a flicker light source and is thus more advantageous than the method that determines a flicker peak by identifying a flicker bottom.

Although in the embodiment described above, the digital single-lens reflex camera 100 is taken as an example of the image pickup apparatus according to the present invention, but the image pickup apparatus according to the present invention is not limited to this. For example, the image pickup apparatus according to the present invention has only to have an LV function and have a function of picking up a still image using an image pickup device in an LV state. Programs for controlling the operation of the first image pickup device 106 and the shutter 104 during continuous shooting may be used to update firmware of the image pickup apparatus.

Although in the embodiment described above, the second image pickup device 116 acting as an AE sensor is not used when a still image is picked up using the first image pickup device 106 in an LV state, no LV image is displayed on the display device 113 after light exposure is started under the exposure condition with the timing a in FIG. 6. Thus, as a substitute for the method that measures a frequency and a peak of flicker as described with reference to FIGS. 7A and 7B, a method that detects flicker using the second image pickup device 116 with no LV image displayed on the display device 113 as with the above method may be used.

Figure 11:
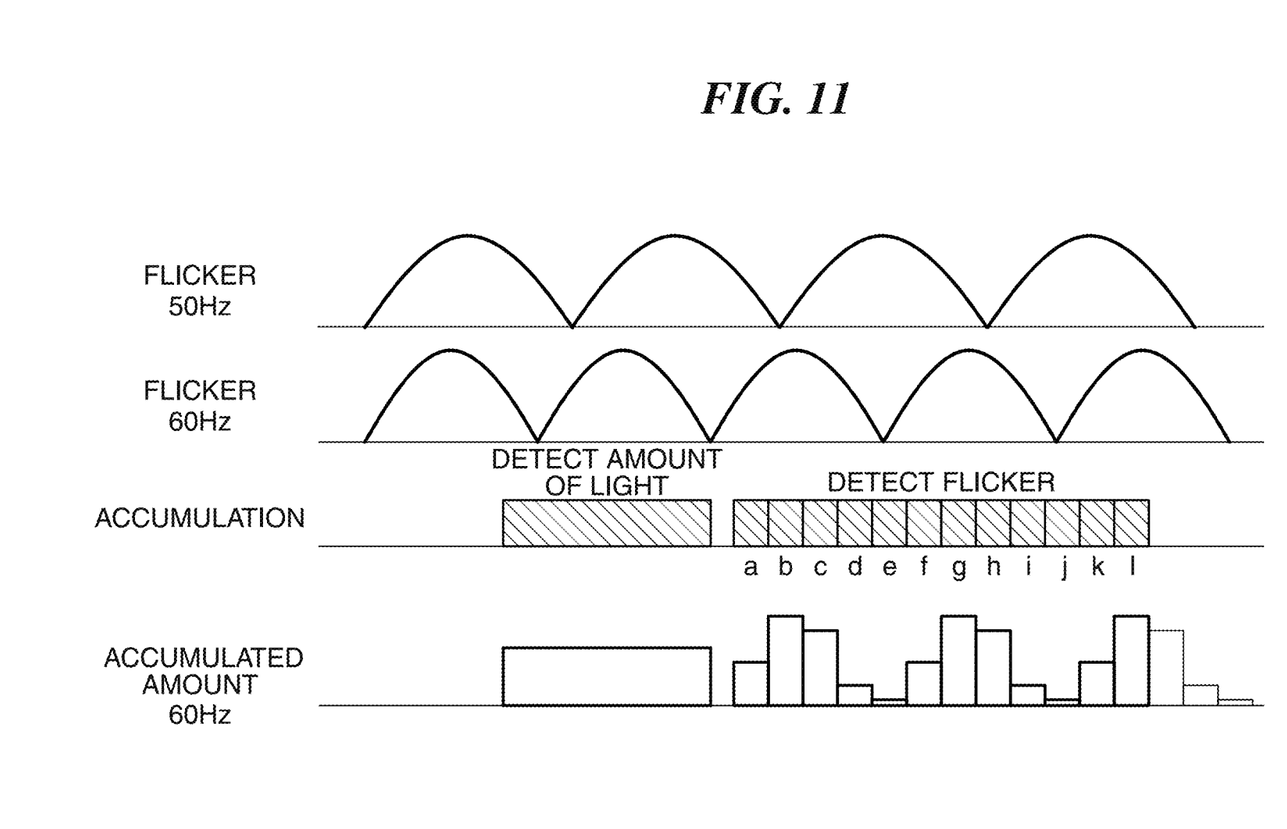
FIG. 11 is a diagram useful in explaining how flicker is detected using a second image pickup device which the digital camera in FIG. 1 has.

FIG. 11 is a diagram useful in explaining how flicker is detected using the second image pickup device 116. In the example shown in the figure, whether a frequency of flicker is 50 Hz or 60 Hz is determined. In FIG. 11, "FLICKER: 50 Hz" schematically shows the intensity of light with a flicker cycle of 1/50 second (a 50 Hz-frequency), and "FLICKER: 60 Hz" schematically shows the intensity of light with a flicker cycle of 1/60 second (a 60 Hz-frequency).

While an LV image is displayed on the display device 113, the mirror 102 swings up toward the pentaprism 119, but when flicker is to be detected using the second image pickup device 116, the mirror 102 is returned to the position shown in FIG. 2. In FIG. 11, "ACCUMULATION" indicates the timing with which electric charge for detecting flicker is accumulated. In an area indicated by "DETECT AMOUNT OF LIGHT", an average of the amount of light from a flicker light source is detected, and in an area indicated by "DETECT FLICKER" comprised of 12 short accumulation time periods a to l, a frequency (cycle) of flicker and a peak of flicker are detected. In FIG. 11, "ACCUMULATION AMOUNT 60 HZ" indicates integral values in the respective accumulation time periods when the frequency of flicker is 60 Hz, and integral values in the case where the frequency of flicker is 50 Hz are omitted. Values of the accumulation time periods a to l are determined so that two or more peaks of flicker can be included in the 12 integral values in the accumulation time periods a to l whichever the frequency of flicker is 50 Hz or 60 Hz. Thus, whether the frequency of flicker is 50 Hz or 60 Hz is determined by finding peaks of flicker based on the magnitude relationship among integral values and computing a time period from one peak to another. After detection of flicker is finished, the mirror 102 swings up to pick up a still image with the flicker peak timing made coincident with the shutter timing, and after that, continuous shooting is controlled in the above described manner.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to readout and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-095593, filed May 8, 2015, which is hereby incorporated by reference herein in its entirety.

What is claimed is:

1. An image pickup apparatus comprising:
   an image pickup device;
   a readout unit configured to readout an image signal of one frame from said image pickup device for detecting a frequency and a characteristic point of a change in an amount of light of flicker before continuous shooting is performed using said image pickup device, and readout an image signal of one frame from said image pickup device for detecting only a characteristic point of the change in the amount of light of flicker whenever image pickup for obtaining a still image of one frame is performed during continuous shooting;
   a detection unit configured to be capable of detecting a frequency and a characteristic point of the change in the amount of light of flicker based on the image signal readout by said reading unit;
   a predicting unit configured to, based on the frequency of a change in the amount of light of flicker detected by said detection unit at first timing before the continuous shooting is performed and the characteristic point of a change in the amount of light of flicker detected by said detection unit at second timing later than the first timing during continuous shooting, predict a characteristic point of a change in the amount of light of flicker after the second timing; and
   a control unit configured to control timing with which said image pickup device is exposed to coincident with the characteristic point after the second timing predicted by said predicting unit.

2. The image pickup apparatus according to claim 1, wherein
   said readout unit controls readout of a signal from said image pickup device so that an image in which a stripe appears based on a change in the amount of light of flicker and an image in which no stripe appears can be obtained before continuous shooting is performed, and said detection unit detects a frequency and a characteristic point of the change in the amount of light of flicker based on the image in which the stripe appears and the image in which no stripe appears.

3. The image pickup apparatus according to claim 1, wherein during continuous shooting, said readout unit controls readout of signals from said image pickup device so that a characteristic point of a change in the amount of light of flicker detected at the second timing is positioned at a center of an image signal of one frame read out from said image pickup device based on a characteristic point of the change in the amount of light of flicker detected by said detection unit at the first timing.

4. The image pickup apparatus according to claim 1, wherein the characteristic point comprises a peak or bottom of a change in the amount of light of flicker.

5. The image pickup apparatus according to claim 4, wherein said detection unit detects, as the characteristic point, a point at which a value of a differentiated waveform obtained by differentiating a waveform of a change in the amount of light of flicker reaches zero.

6. The image pickup apparatus according to claim 5, further comprising a noise removal unit configured to remove noise of light incident on said image pickup device, wherein said detection unit detects, as the characteristic point, a point at which a value of a differentiated waveform obtained by differentiating a waveform of a change in the amount of light that has passed through said noire removal unit reaches zero.

7. The image pickup apparatus according to claim 1, wherein said readout unit reads out an image signal of one frame from said image pickup device within a time period including at least two cycles of change in the amount of light of flicker before continuums shooting is performed, and during continuous shooting, reads out an image signal of one frame from said image pickup device within a time period longer than one cycle of change in the amount of light and shorter than two cycles of change in the amount of light of flicker.

8. The image pickup apparatus according to claim 1, further comprising a display unit configured to be capable of displaying a live-view image of images obtained using said image pickup device,
wherein said predicting unit predicts, based on a frequency of a change in the amount of light of flicker detected by said detection unit at the first timing while the live-view image is displayed and before the continuous shooting is performed, and a characteristic point of a change in the amount of light of flicker detected by said detection unit at the second timing later than the first timing while the live-view image is displayed and during the continuous shooting, a characteristic point of a change in the amount of light of flicker after the second timing.

9. A method of detecting a change in an amount of environmental light in an image pickup apparatus, comprising:
a display step of displaying a live-view image on a display device using an image signal read out from an image pickup device;
a first readout step of reading out an image signal of one frame from the image pickup device for detecting a frequency and a characteristic point of a change in the amount of light of flicker before continuous shooting is performed using the image pickup device;
a first detection step of detecting a frequency and a characteristic point of the change in the amount of light of flicker based on the image signal readout in said first readout step;
a second readout step of reading out an image signal of one frame from the image pickup device for detecting only a characteristic point of a change in the amount of light of flicker whenever image pickup for obtaining a still image of one frame is performed during continuous shooting;
a second detection step of detecting a characteristic point of the change in the amount of light of flicker based on the image signal readout in said second readout step,
wherein in said second readout step, based on a characteristic of a change in the amount of light of flicker detected at first timing, readout of a signal from the image pickup device is controlled so that a characteristic point of a change in the amount of light of flicker detected at second timing later than the first timing is positioned at a center of an image signal of one frame read out from the image pickup device.

10. The method of detecting a change in an amount of environmental light according to claim 9, further comprising a predicting step of, based on the frequency of the change in the amount of light detected in the first timing and the characteristic point of the change in the amount of light of flicker detected in the second timing, a characteristic point of a change in the amount of light of flicker after the second timing.

11. A non-transitory computer-readable storage medium storing a program for causing a computer to execute a method of detecting a change in an amount of environmental light in an image pickup apparatus, the method of detecting a change in the amount of light comprising:
a display step of displaying a live-view image on a display device using an image signal read out from an image pickup device;
a first readout step of reading out an image signal of one frame from the image pickup device for detecting a frequency and a characteristic point of a change in the amount of light of flicker before continuous shooting is performed using the image pickup device;
a first detection step of detecting a frequency and a characteristic point of the change in the amount of light of flicker based on the image signal readout in the first readout step;
a second readout step of reading out an image signal of one frame from the image pickup device for detecting only a characteristic point of a change in the amount of light of flicker whenever image pickup for obtaining a still image of one frame is performed during continuous shooting;
a second detection step of detecting a characteristic point of the change in the amount of light of flicker based on the image signal readout in the second readout step,
wherein in the second readout step, based on a characteristic of a change in the amount of light of flicker detected at first timing, readout of a signal from the image pickup device is controlled so that a characteristic point of a change in the amount of light of flicker detected at second timing later than the first timing is positioned at a center of an image signal of one frame read out from the image pickup device.

* * * * *